Aug. 6, 1963   H. LINDEMANN   3,099,929
BAR SCALPING MACHINE
Filed Oct. 24, 1960
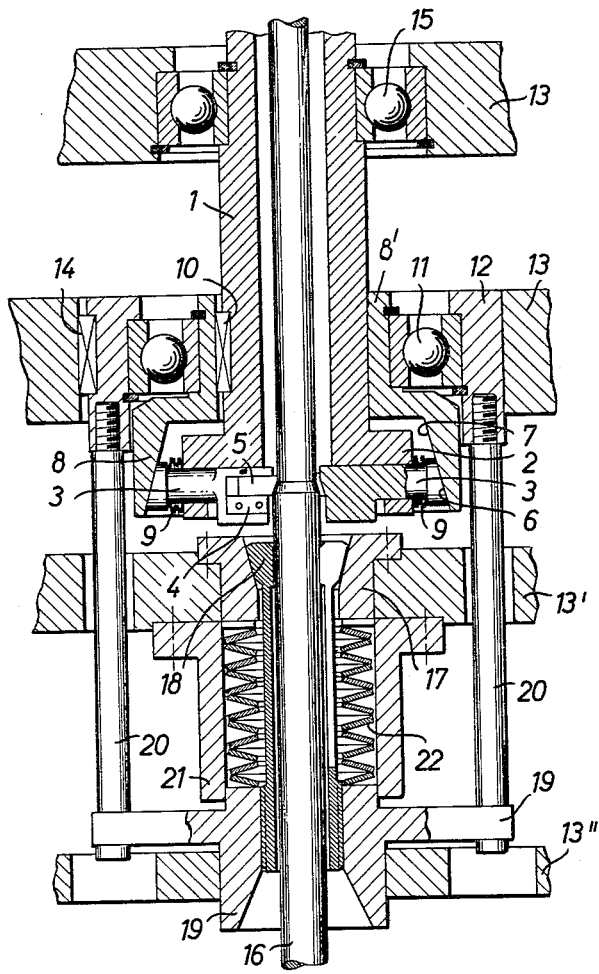
INVENTOR
HANS LINDEMANN
BY Dicke, Craig & Freudenberg
ATTORNEYS

United States Patent Office 3,099,929
Patented Aug. 6, 1963

3,099,929
BAR SCALPING MACHINE
Hans Lindemann, Bielefeld, Germany, assignor to Th. Calow & Co., Bielefeld, Germany
Filed Oct. 24, 1960, Ser. No. 64,590
Claims priority, application Germany Oct. 30, 1959
7 Claims. (Cl. 82—20)

The present invention relates to a machine for scalping or skimming metal bars or other elongated workpieces, which is provided with a revolving cutter head through which the material to be cut is progressively fed while being held in a nonrotary position, and in which the cutting tools which are mounted on the cutter head are adjustable during the rotation of the latter.

In the known scalping or skimming machines of this type, the cutting tools were made adjustable primarily for the purpose of permitting them to be reset to compensate for being worn so that the outer diameter of the workpiece after being cut would remain as constant as possible despite the wear on the cutting tools.

It is an object of the present invention to provide a bar scalping or skimming machine in which a workpiece which prior to being cut has different diameters at different points along the length thereof may be machined in such a manner that only a layer of material of a very definite thickness will at each operation be removed or "scalped" from the peripheral surface of the workpiece. Thus, if, for example, the outer surface of a bar which is to be scalped has a varying diameter along its length, it should after being scalped have a corresponding shape, and the maxima and minima of the changes in diameter should before and after the scalping operation be located at the same points of the workpiece. More specifically, it is therefore the object of the invention to remove practically no more material from the workpiece than is absolutely necessary so that the waste will be as small as possible. In other words, the scalping machine according to the invention should be designed so that the cutting depth will be independent of the rolling tolerance. Such a scalping treatment of the workpiece is of particular advantage in all those cases in which this workpiece after being scalped is subjected to a heat treatment, for example, when bar stock is to be made into seamless pipes.

For attaining the above-mentioned objects, the invention provides a diameter gauging device which engages with the peripheral surface of the workpiece and thereby controls the operation of the cutting tools. Each gauging device therefore measures the varying diameter of the unscalped workpiece and adjusts the cutting tools in relation to the changes so that the cutting depth of the tools will remain uniform despite the changes in diameter.

According to a preferred embodiment of the invention, it is particularly advisable to utilize the resilient guide element, which is mounted directly in front of the cutterhead and which is substantially stationary and not rotatable around the workpiece, so as also to serve as a diameter gauging device. It is, however, also possible to utilize any other kind of guiding means or separate gauging means for controlling the cutting tools on the cutterhead. If the resilient guide element, such as a split taper sleeve or the like, which engages with the workpiece immediately in front of the cutting tools is utilized to serve as a gauging device, it may be used directly to control the cutting tools. Thus, as soon as the diameter of the workpiece changes which is supported by this guide element, the position of the cutting tools in the cutterhead and thus the diameter of the scalped workpiece are also changed proportionally. The maxima and minima of the changes in diameter along the length of the workpiece will therefore not be located at exactly the same points before and after the workpiece is scalped. However, since the distance between the point where the workpiece is held by the resilient guide element, for example, a collet, and the cutting edges of the cutting tools are relatively small, amounting, for example, to 2 cm. or less, this small variation will generally not be of any great importance. In the event, however, that the maxima and minima of the diameters of the uncut and cut workpiece should be located at the identical points, it is merely necessary that suitable means be provided which are dependent upon the feeding speed of the workpiece and which insure that the cutting tools will not be adjusted until the particular point of the workpiece which has been measured by the gauging device on the unscalped part will be located between the cutting tools. In this event, the cutting tools are therefore adjusted in accordance with the feeding speed of the workpiece. If the cutting tools are controlled in this manner, it is also possible to utilize a guide element as a gauging device which is located at a greater distance from the cutting tools or to utilize a special gauging device for adjusting the cutting tools which does not also have to serve as a guide element.

The above mentioned and further objects, features, and advantages of the present invention will become more clearly apparent from the following detailed description thereof, particularly when the same is read with reference to the accompanying diagrammatic drawing which shows, mostly in cross section, one preferred embodiment of the invention.

In this drawing, in which for the sake of clearness only those parts are illustrated which are essential to the present invention, the apparatus is shown as consisting of a hollow shaft 1 which terminates at one end in a cutterhead 2 in which slide members 3 are provided, each of which carries a cutting tool 5 which is secured to the respective slide member by clamping means 4. Each slide member 3 is provided with an inclined outer surface 6 which engages by the resilient action of at least one spring 9 between cutterhead 2 and each slide member 3 with a longer inner surface 7 of a similar inclination in the enlarged socketlike part 8 of a bushing 8′. The hollow shaft 1 and bushing 8′ are rigidly connected to each other by a spline connection 10 and are rotatably mounted within a ball bearing 11 in a ring 12 which, in turn, is mounted in the machine frame 13 by means of a spline connection 14 so as to be nonrotatable but slidable relative to frame 13. Shaft 1 is further rotatably supported on frame 13 by means of a roller bearing 15, but it is mounted therein so as not to be movable in the axial direction.

Directly in front of cutterhead 2, as seen in the direction in which the workpiece 16 is fed, that is, in the upward direction as viewed in the drawing, a substantially stationary but axially resilient guide element is nonrotatably mounted which consists of a sleeve 17 which is rigidly secured to a part 13′ of the machine frame, for example, by means of bolts, and has a conical inner surface at the end facing toward cutterhead 2 in which a split taper sleeve 18 forming a collet is slidably mounted which, when being drawn into the conical bore of sleeve 17, will be compressed so as to engage with the workpiece 16 from all sides. The rear end of collet 18 is secured to a crosshead 19, for example, by being screwed therein, and this crosshead 19 which is connected by rods 20 to ring 12 is slidably guided in the axial direction within a further part 13″ of the machine frame and also within a bushing 21, the flange of which is fitted into the frame part 13′ and is secured thereto, for example, by bolts. Bushing 21 serves as a guide of at least one cup spring 22 which is interposed between bushing 17 and crosshead 19 and exerts a pressure upon crosshead 19 and collet 18 in the direction opposite to the feeding direction of workpiece 16.

If during the feeding movement of a workpiece 16 of a varying diameter in the direction toward cutterhead 2 the diameter of the unscalped workpiece increases, collet 18 will also be shifted toward cutterhead 2 against the action of cup spring 22 on crosshead 19. This movement is transmitted by crosshead 19 through rods 20 to ring 12 and then equally through ball bearing 11 to bushing 8, 8', whereby the conical inner surface 7 on the latter is shifted along the inclined outer surfaces 6 on slide members 3, thus permitting slide member 3 under the action of springs 3 to move outwardly. Cutting tools 5 will then be retracted accordingly from workpiece 16 so that the diameter of the workpiece as produced by cutting tools 5 will be increased accordingly. If, on the other hand, the diameter of the unscalped workpiece diminishes, the reverse procedure occurs and cutting tools 5 will be infed accordingly, so that the diameter of the workpiece will be reduced even though the actual cutting depth of cutting tools 5 never changes.

Although in the particular embodiment of the invention as shown in the drawing the workpiece while being fed is guided by only one substantially stationary collet or the like which is mounted at a point as closely as possible in front of the cutting tools and which is utilized simultaneously as a diameter gauging device according to the invention, another substantially stationary, nonrotatable guiding fixture which may, for example, also consist of a resilient collet or the like, may be mounted at a point as closely as possible behind the cutting tools so that the workpiece will be guided directly in front of as well as directly behind the cutting tools.

Although my invention has been illustrated and described with reference to only one preferred embodiment thereof, I wish to have it understood that it is in no way limited to the details of this embodiment, but is capable of numerous modifications within the scope of the appended claims.

Having thus fully disclosed my invention, what I claim is:

1. Workpiece treating apparatus comprising a hollow shaft, a rotatable cutter head mounted at one end of said shaft and including a tool extending radially inwardly, an annular member mounted coaxially about said cutter head and adapted to move axially with respect to said shaft, a crosspiece provided with an aperture in alignment with the axis of said shaft and axially movable with respect to said shaft, gauging means having one end fixedly secured to said crosspiece and having adjacent the other end thereof inclined outer surface portions, relatively stationary means including inclined surface portions complementary to those of said gauging means, means rigidly interconnecting said crosspiece and said annular member, and means connected to said annular member for varying the radial position of said tool in response to an axial movement of said gauging means.

2. A bar scalping machine comprising a rotatable hollow drive shaft, a cutter head secured to one end of said shaft and including a plurality of cutting tools extending radially inwardly, an annular member mounted coaxially about said cutter head and splined thereto to enable axial movement of said annular member, a crosspiece provided with an aperture in alignment with the axis of said drive shaft and axially movable with respect to said drive shaft, gauging means including a split ring collet member having one end fixedly secured to said crosspiece and having adjacent the other end inclined outer surface portions, relatively stationary means including inclined surface portions complementary to those of said gauging means, means rigidly interconnecting said crosspiece and said annular member, and means connected to said annular member for varying the cutting depth of said cutting tools in response to an axial movement of said gauging means.

3. A bar scalping machine comprising a cutter head rotatably mounted about an axis of rotation which is coincident with a workpiece path of travel, said cutter head having at least one radially adjustable tool mounted therein, means for adjusting said tool during rotation thereof, and workpiece gauging means resiliently biased with respect to said axis, said gauging means being operatively connected to said adjusting means and including inner workpiece engaging surface means, the operative connection of said gauging means and said adjusting means maintaining said tool a predetermined distance closer to said axis than said gauging means whereby a constant chip depth is maintained with respect to any changes in diameter of a workpiece.

4. A bar scalping machine comprising a cutter head rotatably mounted about an axis of rotation which is coincident with a workpiece path of travel, said cutter head having at least one radially adjustable tool mounted therein, means for adjusting said tool during rotation thereof, and workpiece gauging means resiliently biased with respect to said axis, said gauging means being operatively connected to said adjusting means and including a split ring collet member having an inner workpiece engaging surface and an outer tapered surface slidably engaging a complementary surface of a stationary member, the operative connection of said gauging means and said adjusting means maintaining said tool a predetermined distance closer to said axis than said gauging means whereby a constant chip depth is maintained with respect to any changes in diameter of a workpiece.

5. A bar scalping machine comprising a cutter head rotatably mounted about an axis of rotation which is coincident with a workpiece path of travel, said cutter head having at least one radially adjustable tool mounted therein, means for adjusting said tool during rotation thereof including a member mounted coaxially with respect to said axis and movable in the axial direction thereof, said member having an inclined edge portion engaging with a complementary portion connected to said tool, and workpiece gauging means resiliently biased with respect to said axis, said gauging means being operatively connected to said adjusting means and including inner workpiece engaging surface means, the operative connection of said gauging means and said adjusting means maintaining said tool a predetermined distance closer to said axis than said gauging means whereby a constant chip depth is maintained with respect to any changes in diameter of a workpiece.

6. A bar scalping machine comprising a cutter head rotatably mounted about an axis of rotation which is coincident with a workpiece path of travel, said cutter head having at least one radially adjustable tool mounted therein, means for adjusting said tool during rotation thereof, and workpiece gauging means resiliently biased with respect to said axis, said gauging means being operatively connected to said adjusting means and including inner workpiece engaging surface means, said inner workpiece engaging surface means being disposed peripherally around said axis, the operative connection of said gauging means and said adjusting means maintaining said tool a predetermined distance closer to said axis than said gauging means whereby a constant chip depth is maintained with respect to any changes in diameter of a workpiece.

7. A bar scalping machine comprising a cutter head rotatably mounted about an axis of rotation which is coincident with a workpiece path of travel, said cutter head having at least one radially adjustable tool mounted therein, means for adjusting said tool during rotation thereof, and workpiece gauging means resiliently biased with respect to said axis, said gauging means being operatively connected to said adjusting means and including inner workpiece engaging surface means, said gauging means being constructed for movement in an essentially radial direction relative to said axis independently of movement of said tool, said actuating means including means effective upon such movement of said gauging means independently of said tool to effect a corresponding movement of said tool, the operative connection of said gauging means and said adjusting means maintaining said tool a predetermined distance closer to said axis than said gauging means whereby a constant chip depth is maintained with respect to any changes in diameter of a workpiece.

References Cited in the file of this patent

UNITED STATES PATENTS

| | | |
|---|---|---|
| 1,109,387 | Banta | Sept. 1, 1914 |
| 1,669,264 | Reis | May 8, 1928 |
| 1,976,459 | Quichon | Oct. 9, 1934 |
| 2,154,326 | Dorin | Apr. 11, 1939 |
| 2,328,002 | Gall | Aug. 31, 1943 |
| 2,338,687 | Johnson | Jan. 4, 1944 |
| 2,427,322 | Damer | Sept. 9, 1947 |
| 2,596,444 | Siegerist | May 13, 1952 |
| 2,760,213 | Bjalme | Aug. 28, 1956 |
| 2,845,827 | Brauer | Aug. 5, 1958 |